(12) United States Patent
Püttmann

(10) Patent No.: US 9,074,423 B2
(45) Date of Patent: Jul. 7, 2015

(54) METHOD AND SYSTEM FOR INSERTING A PIPE INTO AN UNDERGROUND BOREHOLE

(75) Inventor: Franz-Josef Püttmann, Lennestadt (DE)

(73) Assignee: TRACTO-TECHNIK GMBH & CO., Lennestadt (DE)

( * ) Notice: Subject to any disclaimer, the term of this patent is extended or adjusted under 35 U.S.C. 154(b) by 0 days.

(21) Appl. No.: 13/255,590

(22) PCT Filed: Mar. 2, 2010

(86) PCT No.: PCT/EP2010/001284
§ 371 (c)(1),
(2), (4) Date: Nov. 4, 2011

(87) PCT Pub. No.: WO2010/102741
PCT Pub. Date: Sep. 16, 2010

(65) Prior Publication Data
US 2012/0039670 A1 Feb. 16, 2012

(30) Foreign Application Priority Data

Mar. 11, 2009 (DE) .......................... 10 2009 012 613

(51) Int. Cl.
| E03F 5/06 | (2006.01) |
| E21B 7/20 | (2006.01) |
| B29C 53/08 | (2006.01) |
| B29C 53/20 | (2006.01) |
| E21B 7/30 | (2006.01) |
| F16L 1/032 | (2006.01) |
| F16L 55/165 | (2006.01) |

(52) U.S. Cl.
CPC ................. *E21B 7/20* (2013.01); *B29C 53/086* (2013.01); *B29C 53/20* (2013.01); *E21B 7/30* (2013.01); *F16L 1/032* (2013.01); *F16L 55/1658* (2013.01)

(58) Field of Classification Search
CPC ......... E21B 7/30; F16L 1/032; F16L 55/1658
USPC ................... 405/155–156, 179, 184.2–184.4
See application file for complete search history.

(56) References Cited

U.S. PATENT DOCUMENTS

| 3,894,328 | A | | 7/1975 | Jansson | |
| 4,527,639 | A | * | 7/1985 | Dickinson et al. | 175/61 |
| 4,534,197 | A | * | 8/1985 | Woolley | 72/98 |
| 4,549,860 | A | * | 10/1985 | Yakich | 417/475 |
| 5,048,174 | A | * | 9/1991 | McGuire | 29/451 |
| 5,139,751 | A | * | 8/1992 | Mansfield et al. | 422/292 |
| 5,645,784 | A | | 7/1997 | McMillan et al. | |
| 5,706,861 | A | * | 1/1998 | Wood et al. | 138/98 |
| 5,816,345 | A | | 10/1998 | Keller | |
| 6,419,424 | B1 | * | 7/2002 | Null et al. | 405/174 |
| 6,484,757 | B1 | * | 11/2002 | Warren | 138/98 |
| 6,491,476 | B2 | | 12/2002 | Hesse | |

(Continued)

FOREIGN PATENT DOCUMENTS

| BE | 661 555 | 7/1965 |
| DE | 35 19 439 A1 | 12/1985 |

(Continued)

*Primary Examiner* — Thomas B Will
*Assistant Examiner* — Jessica H Lutz
(74) *Attorney, Agent, or Firm* — Howard IP Law Group, PC

(57) ABSTRACT

The invention relates to a method for inserting a pipe (4) via a pit (1) into an underground borehole, wherein the pipe is flattened before entering the pit, and wherein the pipe is redirected within the pit in the direction of the axis of the borehole, so as to re-deform the pipe before entering the borehole.

13 Claims, 8 Drawing Sheets

(56) References Cited

U.S. PATENT DOCUMENTS

| | | | |
|---|---|---|---|
| 6,551,028 B2 * | 4/2003 | Robinson | 405/184.3 |
| 2004/0258479 A1 * | 12/2004 | Manners | 405/184.2 |
| 2005/0042036 A1 * | 2/2005 | Carter et al. | 405/184.3 |
| 2008/0296066 A1 | 12/2008 | Putnam | |

FOREIGN PATENT DOCUMENTS

| | | |
|---|---|---|
| DE | 38 19 657 C1 | 7/1989 |
| DE | 44 45 605 C1 | 3/1996 |
| DE | 198 17 873 A1 | 10/1999 |
| DE | 101 36 967 A1 | 2/2003 |
| DE | 102006030802 | 1/2008 |
| EP | 0 445 326 A1 | 9/1991 |
| EP | 1 300 543 A1 | 4/2003 |
| GB | 2 227 543 A | 8/1990 |
| GB | 2 336 644 A | 10/1999 |
| SE | 368 435 | 7/1974 |
| WO | WO 90/02904 | 3/1990 |

* cited by examiner

METHOD AND SYSTEM FOR INSERTING A PIPE INTO AN UNDERGROUND BOREHOLE

CROSS-REFERENCES TO RELATED APPLICATIONS

This application is the U.S. National Stage of International Application No. PCT/EP2010/001284, filed Mar. 2, 2010, which designated the United States and has been published as International Publication No. WO 2010/102741 and which claims the priority of German Patent Application, Serial No. 10 2009 012 613.9, filed Mar. 11, 2009, pursuant to 35 U.S.C. 119(a)-(d).

BACKGROUND OF THE INVENTION

The invention relates to a method and a system for inserting a pipe into an underground borehole.

Pipes to be buried underground must meet certain static requirements, because the pipes are exposed to considerable stress from the pressure of the soil during installation and also underground. This applies to pipes to be installed in newly prepared boreholes as well as to pipes to be installed in existing old conduits. These stresses typically require the use of stable materials for the pipes able to withstand a static load. In particular, metals, stoneware, concrete, cast iron and steel are used. Because pipes made from these materials are only slightly elastically deformable, pipe assemblies consisting of short individual pipes must typically be inserted into the borehole or the old conduit, which are then sequentially connected with each other in the start pit during the insertion process. Alternatively, pipes made of a plastic, for example PP (polypropylene), PVC (polyvinylchloride) and PE (polyethylene) can be used. These pipes have higher elastic deformability compared to conventional materials, so that even long pipes can be inserted into a borehole or an old conduit from a start pit by guiding the pipes from the start position on the surface via a curved path through the start pit into the borehole and the old conduit, respectively. However, certain bending radii must not be exceeded which depend on the employed material. These bending radii are defined, for example, in the worksheet GW 323 of the Deutsche Vereinigung des Gas-und Wasserfachs (German Technical and Scientific Association for Gas and Water) e.V. (DVGW). When inserting of new pipes into a public sewer system with their narrow deep pits, the curve shape from the surface to the route axis is characterized by particularly narrow curves. Installation along these curved paths is typically not possible when using conventional methods and associated materials, because the maximally permitted bending radii are exceeded. In practical applications, a suitable pit must frequently be excavated at high cost, which either has a length corresponding to the total length of the pipe and hence allows the pipe to be positioned at the height of the borehole, or has the form of inclined installation pits satisfying the bending radius, so that the permissible stress of the pipe material is not exceeded. However, the excavation of such pits is frequently not possible.

In practical applications, predominantly short pipes which are slightly shorter than the diameter of the pit are used in pits. These can be brought into a horizontal position inside the pits for insertion into the borehole or the old conduit and connected with the rear end of the already installed pipe strand. Because insertion of short pipes is time-consuming and expensive, various techniques have been developed to facilitate connection of the short pipes with one another and to optimize usage of space in the pit. However, these techniques have the common disadvantage that the short pipes require a continuously repeating connection process with an associated risk of leaks due to the large number of joints.

The smallest permissible bending radius for conventional plastic pipes is predefined. However, this bending radius does not satisfy the practical requirements for a continuous and hence cost-effective insertion of the pipes into a pit. Flexible fabric structures, for example made of fleece or fiber reinforced materials, have therefore been developed which can also be inserted through tighter radii of curvature. These can be, as described for example in DE 38 19 657 A1, impregnated with resin and are transformed into their final shape through, for example, application of water vapor and hardened. UV irradiation along the route has also been disclosed as an alternative to a hardening (see DE 44 45 605 A1). Disadvantageously, however, these pipes have considerable production costs.

At the beginning of the 80s, pipes have been developed which could be folded during manufacture and distributed in folded form on reels and inserted into the conduit. These folded pipes could be pulled into the boreholes in the soil along tight radii of curvature due to their smaller (axial) elastic modulus of the cross-section and/or the smaller tensile or compressive loading in the region of the extreme fibers of the cross-section of the folded pipes. However, fixing the pipes in folded form during the pulling process as well as re-deforming the pipes into their original form posed a problem. SE 368 435 B describes a process where the pipe is held together in its folded state by wires or tapes which are removed after the pipe is inserted. However, significant problems have been observed in conjunction with the application and release of the wires or tapes.

DE 35 19 439 A1 therefore discloses using a cylindrically extruded and then folded pipe which is wound on a reel, which is then returned to its original shape by heating after being pulled into the borehole. Although re-deformation is a complicated process, this process is used to this date. The employed pipes are mostly available on drums and have been improved through the use of optimized plastic materials. Bending radii reaching only 900 mm can be attained with such pipes having a diameter of, for example, 200 mm when using suitable materials. The corresponding standards and guidelines for installing such pipes are defined in the worksheet GW 320 II—"Rehabilitation von Gas- und Wasserrohrleitungen mit PE-HD-Verfahren durch Reliningverfahren ohne Ringraum; Anforderungen, Gütesicherung und Prüfung" (Rehabilitation of gas and water pipes with the PE-HD process by relining methods without ring space; requirements, quality control and testing) from DVGW as well as CEN TC 155 WI 209—"Kunststoffrohrleitungssysteme für die Renovierung von erdverlegten drucklosen Entwässerungsnetzen (Freispiegelleitungen)", Teil 1 (Allgemeines) sowie Teil 3 (Close-Fit-Lining) (Plastic piping systems for renovation of underground unpressurized drainage networks (open conduits), Part 1, (General) as well as Part 3 (Close-Fit-Lining)).

Based on this state-of-the-art, it was an object of the invention to provide an improved method for inserting a pipe into an underground borehole via a pit and to provide a suitable system.

SUMMARY OF THE INVENTION

This object is attained by a method for inserting a pipe via a pit into an underground borehole, comprising the steps of: flattening the pipe from an original cross-section before the pipe enters the pit, redirecting the flattened pipe in the it in a direction of an axis of the borehole, and re-deforming the redirected pipe before the pipe enters the borehole.

The core concept of the invention is to flatten a pipe to be inserted into an underground borehole via a pit only shortly before insertion into the pit, which can reduce the elastic modulus of the pipe cross-section and redirect the pipe in the pit along a smaller radius of curvature (to the axis of the borehole). The pipe is then again re-deformed to its original shape before entering the borehole. With the method of the invention, pipes can now be inserted into a borehole via a pit which could otherwise not be inserted with the prescribed radii of curvature in the undeformed state. By flattening the pipe essentially only while the corresponding pipe section is guided along the curved path, the pipe can be deformed almost exclusively elastically, so that the problem according to the state-of-the-art is eliminated, namely to hold a previously folded pipe in its folded shape during insertion in the borehole or the old pipe (see SE 368 435 B) or to return a previously folded and plastically deformed pipe to its original shape (see DE 35 19 439 A1).

The term "borehole" refers according to the invention to any elongated opening in the soil or in a pile in which a pipe can be inserted. In particular, this may include underground boreholes as well as (old) pipes buried underground.

The term "flattening" refers according to the invention to a deformation of the pipe with respect to its cross-section which causes the pipe to have a smaller axial elastic modulus, in relation to its original cross-section, at least about one of its radial axes or the maximum tensile and compressive loading in the extreme fibers to be smaller. This explicitly includes oval and elliptical cross-sections as well as those cross-sections having straight parallel peripheral sections. In particular, this also includes folding the pipe along its longitudinal axis to a U-shaped cross-section.

An apparatus for carrying out the method of the invention includes according to the invention a deformation device with which the pipe is flattened before entering the pit, a guiding device with which the flattened pipe is redirected in the pit, and a re-deformation device with which the pipe is re-deformed before entering the borehole.

In a preferred embodiment of the method of the invention, the pipe may not be re-deformed with the re-deformation device to its original cross-section, but beyond. With this approach, the elastic components of the re-deformation are eliminated, so that the pipe automatically (elastically) assumes its original cross-section after exiting from the re-deformation device. When re-deforming the pipe beyond its original cross-section, a pipe which has been flattened along one of its radial axes and was transformed, for example, into an elliptical shape, is also briefly flattened, for example brought into an elliptical shape, by the re-deformation device along a second radial axis oriented perpendicular to the first radial axis. The second flattening may here be significantly smaller than the first flattening.

Such re-deformation of the pipe beyond its original cross-section may be attained in the apparatus in that the re-deformation device has an oval or elliptical deformation opening through which the pipe is guided for re-deformation. The major axis of this oval or elliptical deformation opening may preferably be oriented perpendicular to the longest radial axis of the previously flattened pipe cross-section. This can be attained with the apparatus by correspondingly aligning the first and the second deformation devices with respect to one another.

Preferably, the re-deformation device can also be constructed with a taper, in particular a conical taper, in the direction of the deformation opening. This facilitates insertion of the flattened pipe into the deformation opening.

Preferably, the circumference of the deformation opening of the re-deformation device may substantially correspond to the pipe circumference. In this way, the pipe is securely in contact with the edge of the deformation opening during the re-deformation along its entire circumference, while simultaneously preventing material buckling, which would occur if the circumference of the deformation opening were significantly smaller than the circumference of the pipe.

In another preferred embodiment of the present invention, the guiding device has a pit support. The pit support can hereby be adapted to the cross-section of the pit, so that for example for a pit having a circular cross-section (e.g., a shaft) the pit support may have a corresponding arcuate support plate constructed to support the forces produced during insertion of the pipe in the borehole over the greatest possible area of the walls of the pit.

In another preferred embodiment, the re-deformation device may be movable in relation to the pit support, so that, for example, with a non-flat (e.g., arcuate) pit support the guiding device can be precisely aligned also with respect to an old pipeline which does not enter the center of the pit.

In another preferred embodiment of the invention, the pipe may be re-deformed with a mandrel. The term "mandrel" according to the invention refers to a device capable of applying compression forces (i.e., pressing across an area) on the inner surface of the pipe or pulling forces on the outer surface of the pipe. Re-deforming the pipe with a mandrel effectively prevents the flattened pipe from collapsing into an undesirable U-shape. Such behavior was observed during attempts to re-deform the flattened pipe by applying only lateral guiding surfaces, which produces different pipe lengths for the inner and outer pipe half. The pipe is stretched in the outer pipe half and compressed in the inner pipe half. Because the material tends to assume a state of lowest stress, and because the stress decreases with decreasing distance of the extreme fiber from the bending line, the undesirable U-shape is formed. In this case, the extreme fiber which would actually be severely compressed bends towards the neutral axis, thereby reducing compressive stress in the material. It has been observed that this effect cannot even be eliminated by stronger lateral guiding for the re-deformation. Instead, such attempt frequently causes an even more severely distorted U-shape of the pipe.

Preferably, the mandrel is constructed to be elastic, so that it can be positioned at the front end inside the pipe before the pipe enters the pit and can be guided together with the pipe through the deformation device, the guiding device and the re-deformation device.

In a particularly preferred embodiment, the mandrel is formed as a pressurized body which can be expanded by filling the body with a fluid. For example, a pressurized body operating as a mandrel can thus be positioned inside the pipe already before the pipe is inserted in the pit, and the pressurized body can be expanded after passing through the guiding device, so that the pressurized body interferes as little as possible with flattening of the pipe in the deformation device as well as deflection of the pipe in the guiding device. The pressurized body can then be expanded by filling it with a fluid just before the pipe is guided through the re-deformation device, so that the pressurized body can meet its function as mandrel by supporting re-deformation of the pipe into its original shape.

Preferably, the fluid may be supplied to the pressurized body through a fluid line, for example, from a supply unit arranged at the surface. The fluid line may be supplied to the pressurized body through the underground borehole and/or through the pipe to be inserted. For improved accessibility, the fluid line can preferably be arranged inside the pipe to be inserted in the borehole.

In another preferred embodiment of the present invention, the pipe is preferably flattened by actively applying transverse forces. For this purpose, the deformation device of the apparatus may include at least two pressing elements which are movable relative to each other for flattening the pipe. An "active application of transverse forces" is different from a passive application of transverse forces, wherein the transverse forces are produced as reaction forces when the pipe is guided through the deformation opening.

Particularly preferred, the pressing elements may have an arcuate shape, so that the pipe is during flattening simultaneously forced into a corresponding arcuate shape. This may optionally eliminate a first guiding device for redirecting the pipe. Such deformation device can be used, for example, to directly redirect the horizontally aligned pipe above ground into a direction pointing towards the pit. With a corresponding design of the deformation device, the deformation device provided according to the invention and the guiding device for deflecting the pipe may be combined in a single apparatus.

The invention also relates to a system composed of an apparatus according to the invention, a pipe, a pulling head connected with the pipe, and pulling means connected with the pulling head.

The pulling head of the system according to the invention has at least one deformation opening preferably in the region located at the height of the neutral axis of the pipe when the pipe is redirected in the guiding device. Particularly preferred are two opposing longitudinal openings (in the longitudinal direction of the pulling head and the connected pipe, respectively). With this/these deformation opening(s), the pulling head assumes a defined elasticity which may enable one half of the pulling head to be compressed when traversing the curved path, without significantly affecting the second half of the pulling head which is then stretched. Conversely, if the pulling head is closed, severe deformations and buckling, which may be impossible to re-deform, may occur in the pipe directly behind the pulling head. In addition, the ring stiffness of the head is increased as a result of the deformation opening(s), thus requiring smaller re-deformation forces for the pipe arranged behind the pulling head.

In another preferred embodiment of the system according to the invention, the system has an additional expansion head for expanding the borehole. In this way, an expansion head specially optimized for expanding a borehole is only necessary when the borehole must actually be widened. In addition, the system can be adapted to the boundary conditions for expanding the respective borehole by interchanging the expansion head. For example, expansion heads designed for compressive expansion of a borehole have a different structure than expansion heads used for bursting an old underground pipe (burst or splitting heads).

Preferably, the expansion head is loosely guided on the pulling means of the system, wherein the expansion head comes into contact with the pulling head during the application of pulling forces, i.e., during insertion of the pipe. The resistance forces from the soil or the old pipe acting on the expansion head are therefore introduced by the pulling head directly into the pulling means. This can reduce the stress on the pulling head and the pipe to be inserted.

The invention also relates to a deformation device constructed according to the invention and to a re-deformation device of the apparatus according to the invention and a pulling head constructed according to the invention of a system according to the invention.

BRIEF DESCRIPTION OF THE DRAWING

The invention will now be described in more detail with reference to exemplary embodiments illustrated in the drawings.

The drawings show in.

DETAILED DESCRIPTION OF PREFERRED EMBODIMENTS

Figure 1:
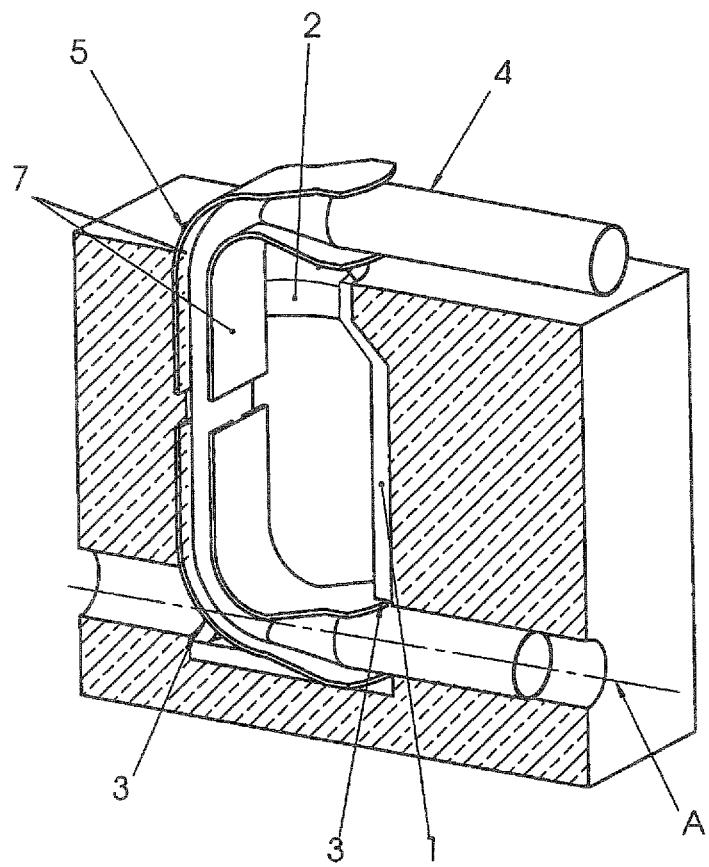
FIG. 1 a schematic diagram of an apparatus according to the invention in a first embodiment.

FIG. 1 shows a pit 1 of a sewage system. The pit 1 has a vertical sewer opening 2 facing the surface, which is typically closed by a drain cover, and horizontal sewer-side openings 3. Each of the sewer-side openings 3 represents an end of a sewer pipe and defines an axis A into which a (new) pipe 4 is to be inserted. The pipe 4 is initially located above ground outside the pit 1. To insert the pipe 4 via the sewer opening 2 into the opening 3 of the sewer pipe through the pit 1, the pipe 4 must be moved along a curved path with a twofold change in direction. Accordingly, two 90° curves are produced when the pipe 4 is inserted into the sewer pipe via the pit 1.

Figure 2:
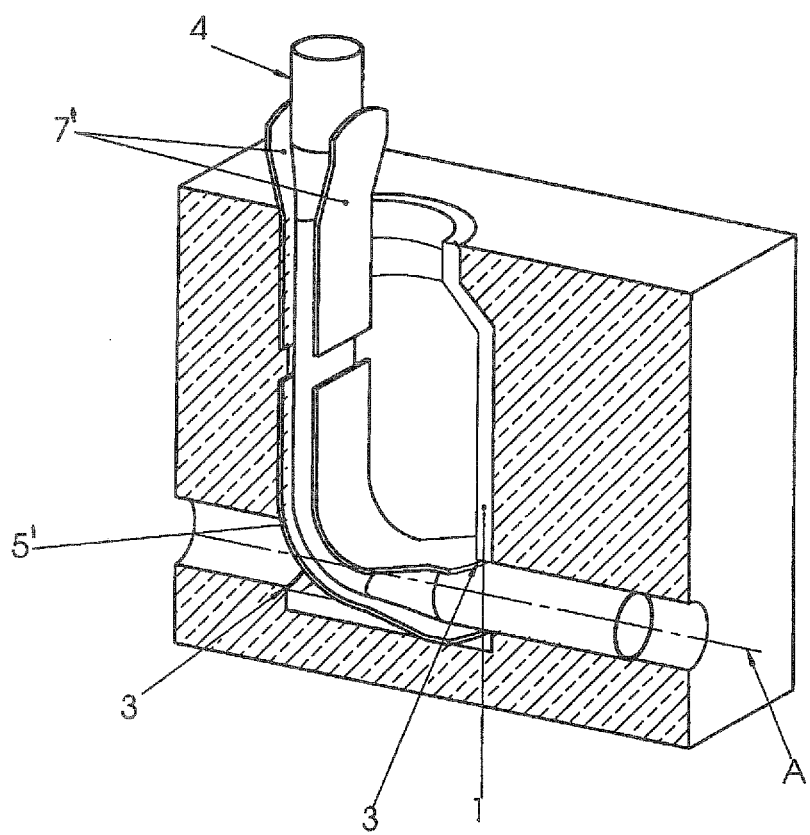
FIG. 2 a schematic diagram of an apparatus according to the invention in a second embodiment.

FIG. 2 shows an alternative embodiment of the apparatus of FIG. 1, wherein the pipe 4 is inserted into the pit 1 vertically, so that only one 90° curve must be negotiated at the bottom of the pit 1.

The pipe 4 negotiates the respective curves with the aid of a guiding device 5, 5', which has two mutually parallel guiding elements 7, 7'. The guiding devices 5, 5' not only define the course for the pipe 4, but also cause the pipe 4 to be flattened before insertion into the pit 1 because the two guiding elements 7, 7' at the front end are tapered, so that their spacing is reduced from a first value which substantially corresponds the initial diameter of the pipe 4 to a smaller value. The re-deformation of the pipe 4 upon exiting from the guiding devices 5, 5' is in these embodiments exclusively attained through the elasticity of the pipe 4.

Figure 3:
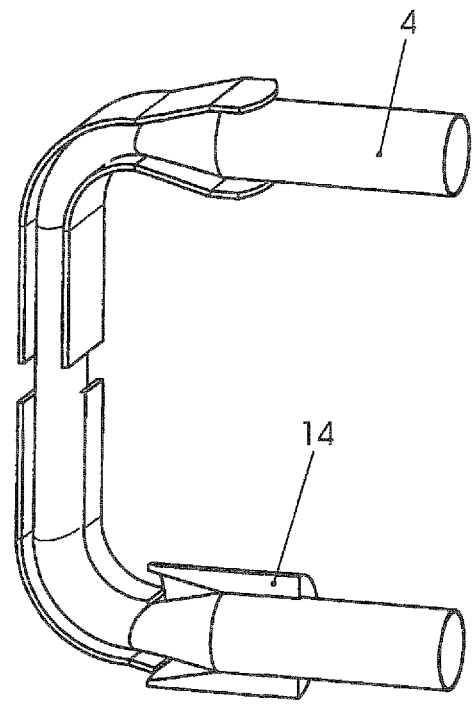
FIG. 3 a schematic diagram of an apparatus according to the invention in a third embodiment.

The embodiment of the apparatus of the invention according to FIG. 3 differs from the aforedescribed embodiments in that a re-deformation device 14 is provided which has a conical inlet and terminates in a circular re-deformation opening. The re-deformation opening aids in re-deforming the pipe 4.

Figure 4:
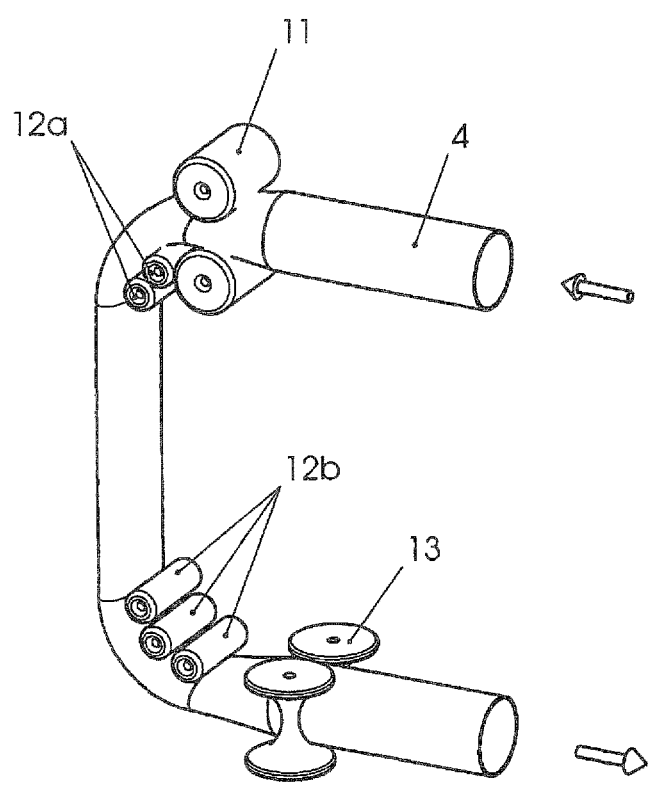
FIG. 4 a schematic diagram of an apparatus according to the invention in a fourth embodiment.

In the embodiment of an apparatus according to the invention illustrated in FIG. 4, rollers 11, 12a, 12b, 13 are used for flattening, redirecting and re-deforming the pipe 4. When the pipe 4 enters a pit, the pipe is initially flattened (deformed)

with the rollers 11. The rollers 12a and 12b ensure along the further path that the pipe 4 passes the curved region in a defined manner and hereby maintains its flattened shape. The rollers 12a and 12b furthermore reduce the friction coefficients when the pipe 4 passes through the guiding device defining the curved path and also reduce the stress on the material. The rollers 13 cause the pipe 4 to return to its original shape in the exit region of the guiding device or support the material-related relaxation.

FIGS. 6 to 10 show details of an apparatus according to the invention in a fifth embodiment.

Figure 6:
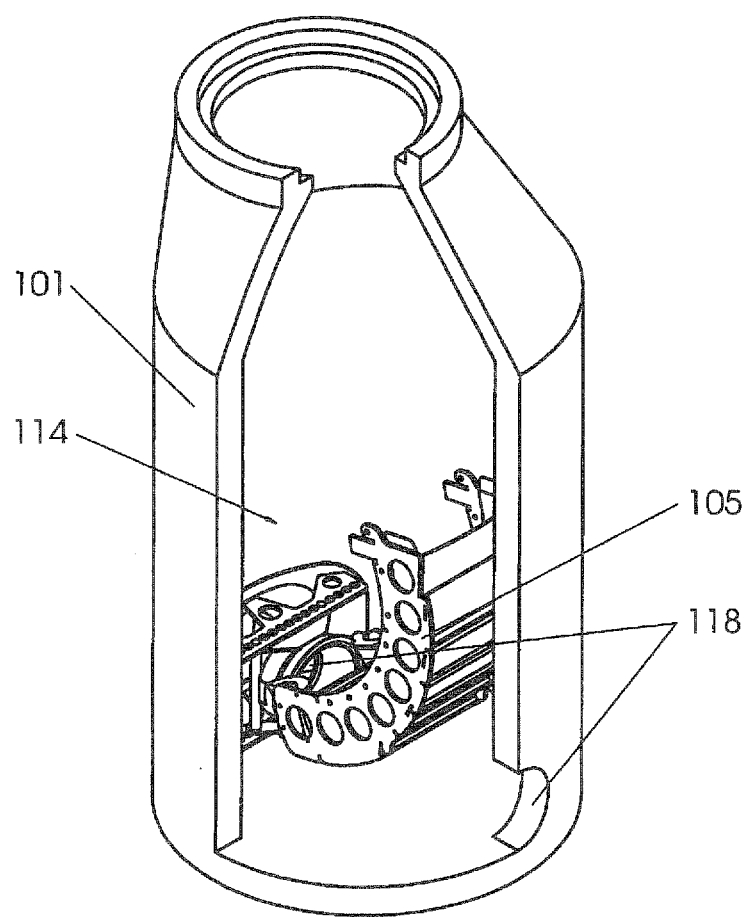
FIG. 6 a re-deformation device and a guiding device of an apparatus according to the invention in a fifth embodiment.

FIG. 6 shows in an isometric view a partially cut-open pit 101 in which a re-deformation device 114 and a guiding device 105 are arranged.

Figure 7B:
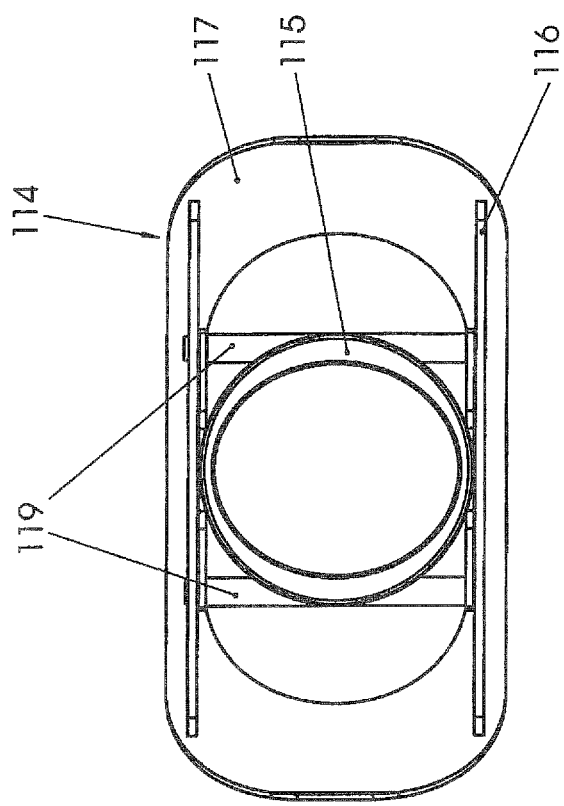
FIG. 7a/b the re-deformation device of FIG. 6 in different views.
Figure 7A:
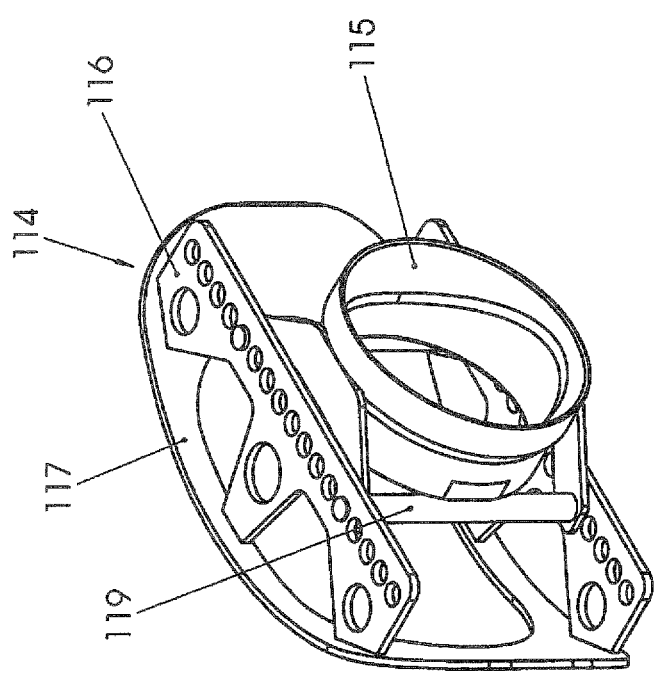

The employed re-deformation device 114 is illustrated in FIGS. 7a and 7b separately in different views. The re-deformation device 114 includes a re-deformation ring 115 with an inlet having a circular cross section. The inner cross-section of the re-deformation ring 115 tapers towards an oval or elliptical re-deformation opening, starting from the inlet. The major axis of this re-deformation opening is hereby oriented vertically so that the horizontally flattened pipe entering the re-deformation device 114 is re-deformed by the re-deformation device 114 not only to its circular initial cross-section, but beyond. The re-deformation device 114 has furthermore a frame 116 with which the re-deformation device 114 can be oriented on a support surface, for example the bottom of the pit 101 in FIG. 6. The frame 116 also includes a support plate 117 which has an arcuate shape and is thereby matched to the circular cross-section of the pit 101. Such support plate 117 matched to the interior cross-section of the pit 101 provides a uniform support for the forces generated when a pipe is inserted in a conduit or a borehole. The hereby attained uniform surface pressure significantly prevents damage to the wall of the pit 101. To compensate for a potentially non-centered inlet of the old pipe in the pit 101, the re-deformation ring 115 is also constructed for lateral displacement relative to the frame 116 of the re-deformation device 114. The re-deformation ring 115 can thus be matched to a possibly non-centered position of the sewer opening 118 in the wall of the pit 101 and then suitably attached on the frame 116 with two bolts 119.

Figure 5:
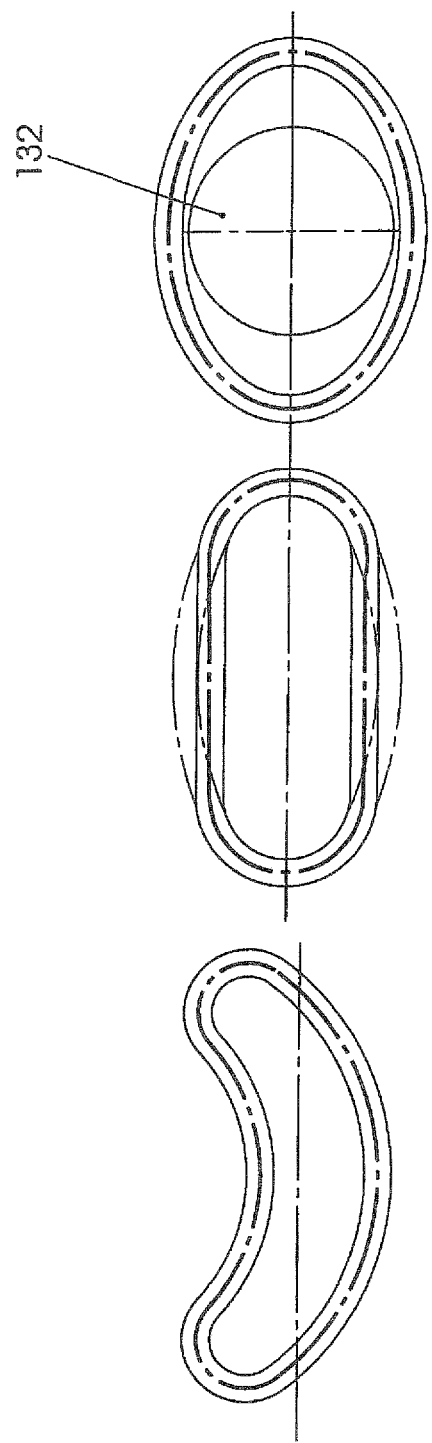
FIG. 5 in a schematic diagram, the use according to the invention of a mandrel for re-deforming a pipe.
Figure 8B:
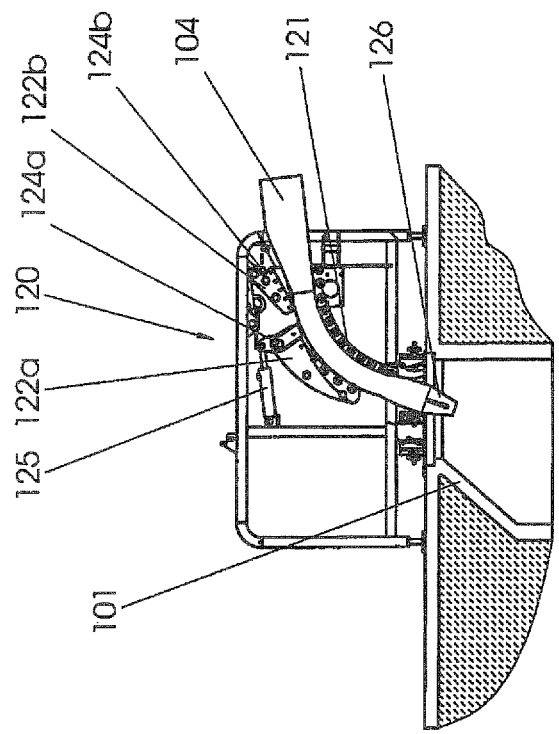
FIG. 8b the deformation device of FIG. 8a in a closed position.
Figure 8A:
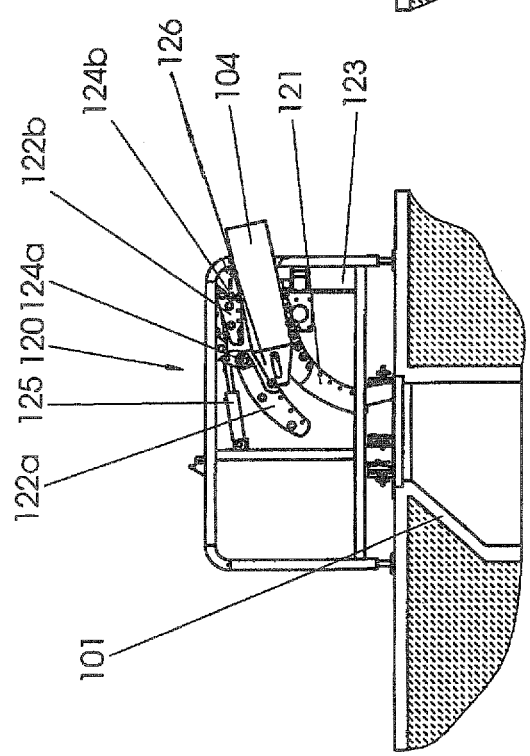
FIG. 8a the deformation device of the apparatus according to the invention in the fifth embodiment in an open position.

FIGS. 8a and 8b show a deformation device 120 which is arranged on the ground above the pit 101 and used to flatten the top and bottom side of a pipe 104 and to bring the pipe to the shape illustrated in the center of FIG. 5 before the pipe 104 is introduced into the pit 101. For this purpose, the deformation device 120 has three pressing elements 121, 122a, 122b provided with guide rollers, wherein the bottom pressing element 121 is fixedly attached inside a frame 123 of the deformation device 120. Each of the other two pressing elements 122a, 122b is pivotally arranged for rotation about a corresponding swivel joint 124a, 124b, so that their distance from the bottom pressing element 121 can change. The upper pressing element 122a can be pivoted about the swivel joint 124 with a hydraulic cylinder 125. A corresponding hydraulic cylinder is also provided for pivoting the second upper pressing element 122b. Pivoting the pressing elements 122a, 122b is also used, on one hand, to guide a pulling head 126 arranged at the front end of the pipe 104 through the deformation device 120 without making it necessary to also flatten the pulling head 126. In addition, transverse forces can actively be applied to the pipe 104 by closing the two pressing elements 121, 122 after the pulling head 120 has passed through the pressing elements 121, 122 so as to deform or flatten the pipe 104 immediately after the pulling head 126 and to simultaneously force the pipe 104 into a first curved path. This may be done entirely without applying a pulling force. The maximum tensile stress required to guide the pipe through the deformation device can be reduced compared to a passive deformation device, for example the deformation device illustrated in FIGS. 1 to 4, wherein the pipe is initially also flattened by transverse forces resulting from reaction forces caused by the pulling forces exerted on the pipe and the resulting movement of the pipe through the tapered deformation device.

Figure 9:
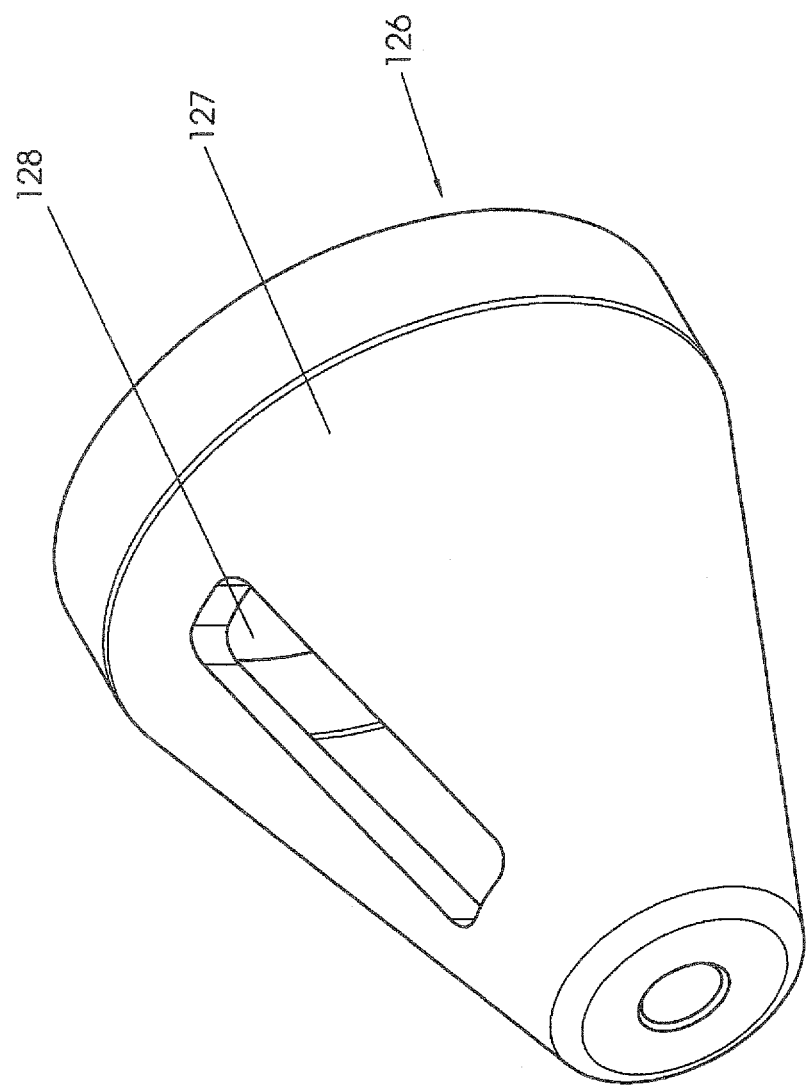
FIG. 9 the pulling head of the apparatus according to the invention in the fifth embodiment.

FIG. 9 shows the pulling head already illustrated in FIG. 8 in an enlarged isometric view. The pulling head includes a conical housing 127 in which two opposing longitudinal openings 128 are introduced. With these longitudinal openings 128, the pulling head 126 attains a certain flexibility, in particular with respect to a movement or deformation of the two halves of the pulling head 126 which are separated from one another by the longitudinal openings 128. The longitudinal openings 128 are arranged so as to be located proximal to the neutral axis of the pipe 104 when the pipe 104 is bent by the deformation device 120 and/or the guiding device 105. Advantageously, one half of the pulling head 126 can then be compressed when passing through the curved paths defined by the deformation device 120 and the guiding device 105, whereas the corresponding other half can expand commensurately and independent of the first half. With a closed pulling head, severe deformations and buckling may occur in the pipe region behind the pulling head 126 which may potentially be impossible to re-deform again. The longitudinal openings 128 also increase the ring stiffness of the pulling head 126, so that potentially only small setup forces may be required for re-deforming the pipe 104.

Figure 10:
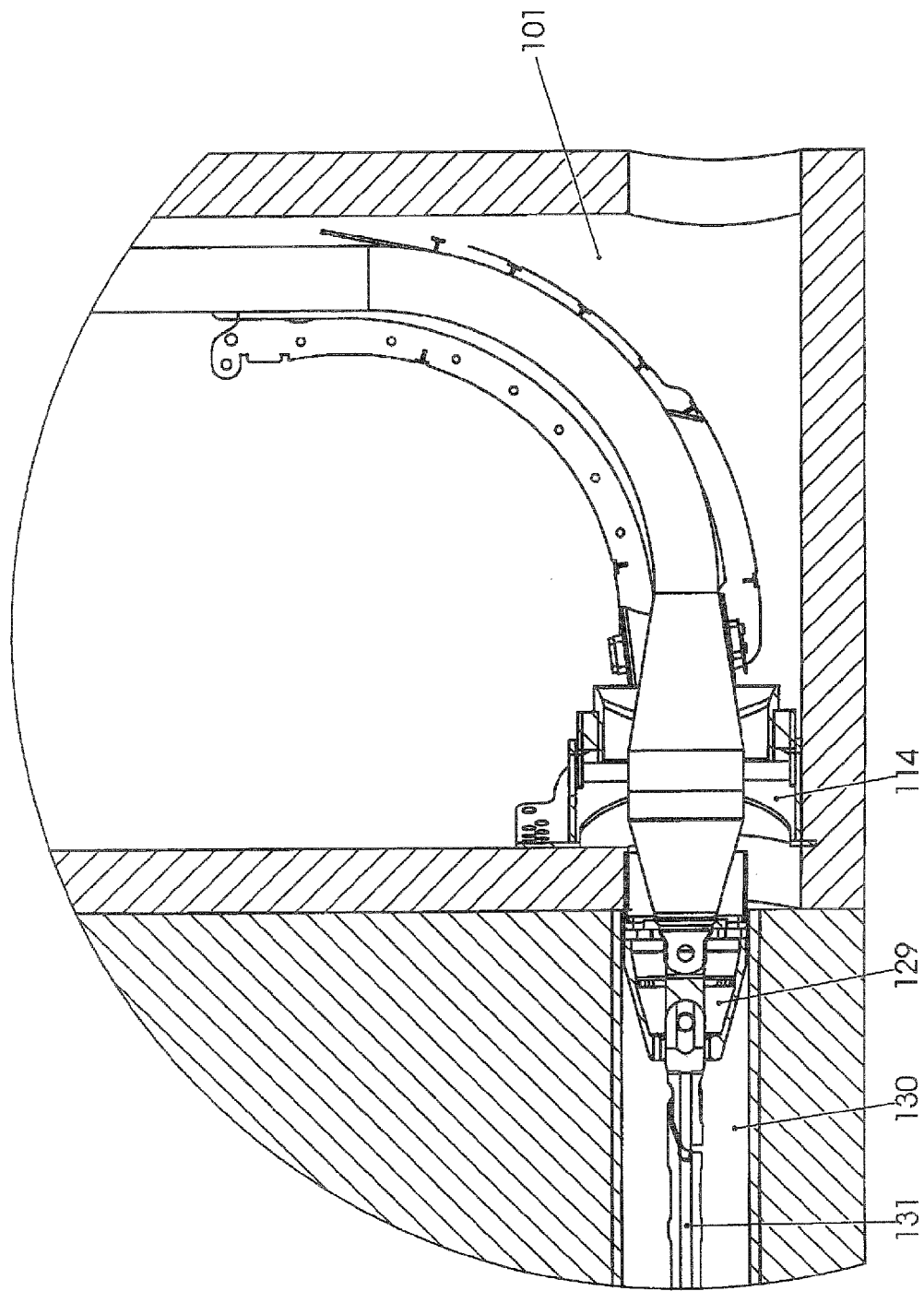
FIG. 10 an expansion head used with the apparatus according to the invention in the fifth embodiment.

FIG. 10 shows furthermore the use of an additional expansion head 129, which is used to burst the old sewer pipe for inserting the new pipe 104 with an identical or even larger interior diameter into the respective borehole. The expansion head 129 is inserted into the old sewer pipe 130 before positioning the re-deformation device 114 in the pit 101.

After installation of the re-deformation device 114 and the guiding device 105, a pulling rod assembly 131 is pushed through the front opening of the expansion head 129 and connected with the pulling head 126. When the pulling head 126 is pulled through the old sewer pipe 130 by the pulling rod assembly 131, the expansion head 129 is carried along by the pulling head 126. The pulling forces generated during the expansion process are thus introduced directly into the pulling head 126 and then into the pulling rod assembly 131. This may potentially reduce the stress on the pulling head 126 and the pipe 104, respectively.

FIG. 5 shows in a schematic diagram the use of a mandrel 132 according to the invention for aiding re-deformation of the pipe 104 to its initial circular cross-section. The flattened cross-section of the pipe 104 before the pipe 104 enters the re-deformation device 114 is depicted in the center of FIG. 5. It has been observed that under certain circumstances a pipe cannot be re-deformed to its initial cross-section by merely passing the pipe through a corresponding re-deformation opening, because this may cause the pipe to collapse into the U-shape illustrated on the left side of FIG. 5. This is caused by the fact that the material of the pipe always tends to assume a state of lowest stress. However, the stress decreases with decreasing distance between the extreme fiber and the neutral axis. The extreme fiber, which is severely compressed, may then bend in the direction of the neutral axis, thereby reducing the compression stress in the material. Arranging the mandrel 132 inside the pipe 104 directly behind the pulling head 126 should prevent such bending. The mandrel 132 is constructed as a pressurized body in form of a bladder. The bladder can be expanded by supplying compressed air or another fluid, wherein the bladder is slack when unfilled or only slightly filled and thus does not or only marginally interfere with a corresponding deformation of the pipe 104 in the deformation device 120 and in the guiding device 105. The bladder is supplied with compressed air through a compressed air hose (not shown) which may be routed, for example, through the pipe 104. After the pipe 104 has passed through the guiding device 105, the insertion process can be briefly stopped to expand the bladder with compressed air. Only thereafter is the front end of the pipe, with the expanded bladder disposed therein, pulled into the re-deformation device 114. The bladder presses radially outwardly against the interior wall of the pipe 104, thereby preventing a the pipe 104 from collapsing into the aforedescribed U-shape. After the front section of the pipe 104 has been re-deformed to its original cross-section, the subsequent section of the still flattened pipe 104 is re-deformed commensurately. A collapse to the U-shape is hence completely prevented.

All features of the aforedescribed embodiments can be combined with each other in any conceivable constellation.

The invention claimed is:

1. An apparatus for inserting a pipe via a pit into an underground borehole, comprising:
a deformation device comprising first, second and third pressing elements and constructed to flatten the pipe from an original substantially circular cross-section into a first oval cross-section having a first major radial axis before the pipe enters the pit,
a guiding device constructed to redirect the flattened pipe in the pit in a direction of an axis of the borehole, and
a re-deformation device having a re-deformation ring forming an inlet having an inner cross-section, with the inner cross-section of the re-deformation ring tapering, starting from the inlet, towards an oval or elliptical re-deformation exit opening having a major axis perpendicular to the first major radial axis and having a circumference corresponding substantially to a circumference of the pipe, wherein the exit opening is constructed to re-deform the redirected pipe beyond the original substantially circular cross-section into a second oval cross-section having a second major radial axis perpendicular to the first major radial axis before the pipe enters the borehole,
wherein the first pressing element is fixedly attached to a frame of the deformation device, and the second and third pressing elements are pivotally attached to the frame of the deformation device such that the distance between the second and third pressing elements, and the first pressing element, may be varied.

2. The apparatus of claim 1, further comprising a pit support, wherein the re-deformation device is movable relative to the pit support.

3. The apparatus of claim 1, further comprising a mandrel inserted inside the pipe to prevent a collapse of the pipe when the pipe is re-deformed.

4. The apparatus of claim 3, wherein the mandrel is constructed to be elastic.

5. The apparatus of claim 3, wherein the mandrel is constructed as a pressure vessel which can be expanded by filling with a fluid.

6. The apparatus of claim 5, further comprising a fluid line connected with the pressure vessel and routed through the pipe.

7. The apparatus of claim 1, wherein the re-deformation device further comprises a frame, and wherein the re-deformation ring is mounted to the frame.

8. An apparatus for inserting a pipe via a pit into an underground borehole, comprising:
a deformation device constructed to flatten the pipe from an original substantially circular cross-section into a first oval cross-section having a first major radial axis before the pipe enters the pit,
a guiding device constructed to redirect the flattened pipe in the it in a direction of an axis of the borehole, and
a re-deformation device having a re-deformation ring forming an inlet having an inner cross-section, with the inner cross-section of the re-deformation ring tapering, starting from the inlet, towards an oval or elliptical re-deformation exit opening having a major axis perpendicular to the first major radial axis and having a circumference corresponding substantially to a circumference of the pipe, wherein the exit opening is constructed to re-deform the redirected pipe beyond the original substantially circular cross-section into a second oval cross-section having a second major radial axis perpendicular to the first major radial axis before the pipe enters the borehole,
wherein the re-deformation device further comprises a frame including a support plate having a generally curved shape corresponding to a shape of an interior of the pit, and wherein the re-deformation ring is mounted to the frame.

9. The apparatus of claim 8, wherein the deformation device comprises first, second and third pressing elements.

10. The apparatus of claim 9, wherein the first pressing element is fixedly attached to a frame of the deformation device, and the second and third pressing elements are pivotally attached to the frame of the deformation device such that the distance between the second and third pressing elements, and the first pressing element, may be varied.

11. An apparatus for inserting a pipe via a pit into an underground borehole, comprising:
a deformation device constructed to flatten the pipe from an original substantially circular cross-section into a first oval cross-section having a first major radial axis before the pipe enters the pit,
a guiding device constructed to redirect the flattened pipe in the it in a direction of an axis of the borehole, and
a re-deformation device having a re-deformation ring forming an inlet having an inner cross-section, with the inner cross-section of the re-deformation ring tapering, starting from the inlet, towards an oval or elliptical re-deformation exit opening having a major axis perpendicular to the first major radial axis and having a circumference corresponding substantially to a circumference of the pipe, wherein the exit opening is constructed to re-deform the redirected pipe beyond the original substantially circular cross-section into a second oval cross-section having a second major radial axis perpendicular to the first major radial axis before the pipe enters the borehole,
wherein the re-deformation device further comprises a frame, and wherein the re-deformation ring is mounted to the frame, along a length thereof, in one of a plurality of positions in which it is mountable.

12. The apparatus of claim 11, wherein the deformation device comprises at least two pressing elements which are displaceable with respect to one another for flattening the pipe.

13. The apparatus of claim 12, wherein the pressing elements have an arcuate shape, causing the flattened pipe to likewise assume a corresponding arcuate shape.

* * * * *

UNITED STATES PATENT AND TRADEMARK OFFICE
CERTIFICATE OF CORRECTION

| | | |
|---|---|---|
| PATENT NO. | : 9,074,423 B2 | Page 1 of 1 |
| APPLICATION NO. | : 13/255590 | |
| DATED | : July 7, 2015 | |
| INVENTOR(S) | : Franz-Josef Puttmann | |

It is certified that error appears in the above-identified patent and that said Letters Patent is hereby corrected as shown below:

In the Claims

Column 10, line 8, claim 8, the phrase "in the it" should read "in the pit".

Column 10, line 42, claim 11, the phrase "in the it" should read "in the pit".

Signed and Sealed this
Sixteenth Day of February, 2016

Michelle K. Lee
*Director of the United States Patent and Trademark Office*